United States Patent Office 3,393,145
Patented July 16, 1968

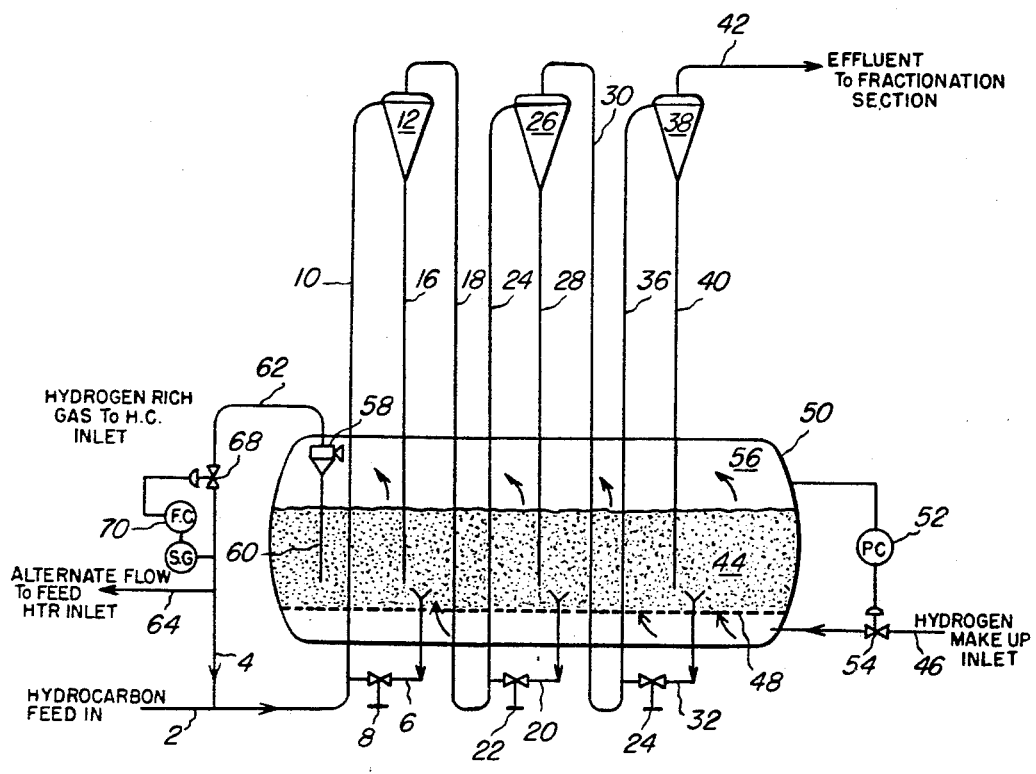

3,393,145
HYDROREGENERATIVE CATALYTIC PROCESS
Thomas Dill, Westport, Conn., and John G. Mitchell, Larchmont, N.Y., assignors to Mobil Oil Corporation, a corporation of New York
Filed July 27, 1965, Ser. No. 475,116
13 Claims. (Cl. 208—59)

This invention is concerned with the catalytic conversion of hydrocarbons. In one respect, the present invention is concerned with a hydroregenerative catalytic process for the conversion of relatively high boiling hydrocarbons to lower boiling hydrocarbons. In another aspect the present invention is concerned with the methods and arrangement of processing steps to provide a hydroregenerative system for conversion of hydrocarbons and regeneration of the catalyst.

It has been found that considerably improved results may be obtained in catalytic cracking of various hydrocarbon oils when the catalytic cracking operation is carried out in stages under properly controlled conditions. The conditions contributing to those improved results include the use of relatively high temperatures, short contact times between hydrocarbon vapors and catalyst particles and techniques permitting employment of catalyst particles in a relatively dispersed phase condition.

When employing dense fluid phase catalytic techniques, a major portion of the heat of reaction has been supplied in these prior art techniques by the sensible heat of the circulated hot regenerated catalyst. Accordingly, the use of high temperatures requires the use of relatively high catalyst/oil ratios to encompass this type of heat supply. However, these high catalyst to oil ratios are not particularly desirable in systems employing catalysts having an activity substantially higher than that normally attributed to an amorphous silica alumina type cracking catalyst. On the other hand high catalyst to oil ratio systems have necessarily been operated at conditions of temperature pressure and residence times which did not permit the use of even the amorphous Si Al catalyst at its highest activity. It has also been found in these dense phase processes that the amount of absorbed oil which may be removed from spent catalyst is a function of the length of time that it is in contact with the catalyst and the conditions of contact. It appears that the absorbed material in the catalyst particles often referred to as coke or carbonaceous material is a condensation and/or polymerization reaction product brought about by processing hydrogen deficient hydrocarbon feed materials. The catalyst particles thus contaminated and deactivated must be treated in a plurality of steps including stripping with steam or other suitable gaseous material followed by treating with oxygen containing gaseous material to remove these carbonaceous materials by burning thereby heating the particles to an elevated temperature.

An object of this invention is to provide an improved method for converting hydrocarbons in the presence of finely divided catalytic material maintained at a high activity.

Another object of this invention is to provide an improved method and means for converting hydrocarbons in the presence of high activity catalytic material.

Other objects and advantages of this invention will become more apparent from the following description.

The present invention applies and is particularly directed to a method for converting hydrocarbons with a high activity catalyst comprising a catalytically active crystalline alumino silicate. In a particular aspect the invention is concerned with the system for cracking hydrocarbon feed material such as gas oils, topped crude, residual oils and other high boiling hydrocarbon fractions known as reduced crudes or combinations of these materials in the presence of suspended finely divided catalyst material either as a relatively dilute phase suspension and/or a dense phase suspension. In one embodiment of this invention a dense fluid bed of catalyst particles is maintained under conditions to effect substantial removal of carbonaceous material from the catalyst particles. Catalyst particles thus regenerated or hydrogen treated are removed from the bed of catalyst for passage through one or more elongated dispersed phase reaction zones suspended in hydrocarbon vapors under hydrocarbon conversion condition including a hydrocarbon contact time in the range of from about 2 up to about 15 seconds and generally not more than about 4 seconds in any one dispersed phase conversion zone. A temperature of at least about 700° F. and sufficiently high to maintain the hydrocarbon feed in a vaporous condition in the dispersed phase contact zone is preferred. The catalyst particles are separated from hydrocarbon vapors adjacent the end of each dispersed phase elongated reaction zone and the separated catalyst particles from which hydrocarbon vapors were removed are returned to the bed of catalyst from which withdrawn. The insufficiently converted hydrocarbon vapors are thereafter passed through another of the dispersed phase contact zones above described for contact with freshly regenerated catalyst.

In the above described arrangement, it is contemplated that the conversion product from any one dispersed phase contact zone may be separated from insufficiently converted hydrocarbons, and the latter is thereafter passed to the next conversion stage in the plurality of dispersed phase conversion stages. It is contemplated in yet another embodiment of employing a single dense fluid bed of catalyst as the catalyst source for all dispersed phase contact zones or a separate dense fluid bed of catalyst particles may be employed for each dispersed phase conversion stage.

It is also contemplated as shown in the attached drawings of passing all the vaporous hydrocarbon material separated from the catalyst in one dispersed phase reaction zone directly to the next succeeding reaction zone in the sequence in contact with fresh catalyst particles from the bed of regenerated catalyst particles. On the other hand as suggested above, product separation may be accomplished at the end of each dispersed phase conversion section. Accordingly, the catalyst separated from hydrocarbon vapors in a cyclone separator such as one or more cyclone separators at the outlet of each elongated dispersed phase contact zone or reactor is returned to a relatively dense fluid bed of catalyst undergoing regeneration by the method of this invention. The separated catalyst is withdrawn from each separator by a standpipe or dip leg of sufficient length to overcome any pressure difference between the vapor dispersed phase contact zones and the regeneration zone. In the method of this invention the regeneration of the catalyst particles will be carried out in a dense fluid bed of catalyst particles using a hydrogen rich gas for fluidization and condensation product removal. By regeneration of catalyst particles according to this invention we mean the removal of relatively soft carbonaceous material such as polymer deposits or condensation products formed on the catalyst which are in a condition for removal with hydrogen and recoverable with other hydrocarbon conversion products of the system.

Operating conditions in the dense fluid bed regeneration step will be of a severity sufficient to accomplish removal of at least a major portion if not substantially all of the residual hydrocarbonaceous material deposited on the catalyst particles during the short contact time hydrocarbon conversion steps. In the method and system of this invention, the regenerator operating pressure will be sufficiently higher than the pressure at the inlet of any one hydrocarbon contacting step or stage to provide a pressure difference sufficient to move catalyst particles from the regenerator to each riser inlet through a suitable flow control valve or other catalyst regulating device. In accordance with this invention maintaining the activity or regeneration of the catalyst is accomplished with hydrogen rich gas. That is, a hydrogen partial pressure is maintained in the regenerator section containing the dense fluid bed of catalyst particles at a pre-selected high level by the removal of a controlled amount of purge gas from the regenerator to the dispersed phase hydrocarbon conversion system. If desired, all of this hydrogen containing purge gas from the regenerator may be passed to the first dispersed phase contact zone or only a desired portion of the regenerator hydrogen rich gas may be passed to the inlet of each dispersed phase contact step. In operation of the system herein described, the volume of purge gas can be and is preferably controlled according to the density of the regenerator off gas whereby holding a constant gas density would be indicative of a constant hydrogen concentration or partial pressure in the regeneration zone. When operating the system by this control mechanism, the fresh hydrogen make-up or volume of gas added thereto is controlled to maintain the regenerator total pressure as a desired level. Furthermore the arrangement herein discussed provides a system and method of operation which minimizes the hydrogen inventory required to accomplish the results desired.

In the operation of the systems herein described, the hydrogen containing vaporous material recovered from the regenerator which is passed directly to the dispersed phase cracking steps operates to minimize the deposition of carbonaceous material and reduces the tendency towards polymer formation on the particles of catalyst, thereby significantly improving the catalytic cracking yield product distribution over that which occurs without the presence of hydrogen. It is apparent from the above discussion that the amount of hydrogen containing gas available to flow from the regenerator to the cracking stages can be limited to substantially any excess of that amount needed to carry out the desired regeneration of the catalyst. Thus any benefits realized from inclusion of hydrogen in a relatively low pressure hydrocarbon cracking step can be increased to substantially any extent without having an adverse effect on the regeneration of the catalyst.

In the method and system of this invention the hydrocarbon feed flows through a series of contact-separation stages with high activity finely divided particles of catalyst supplied to each conversion stage to form a relatively dispersed phase mixture at a temperature in the range of from about 500° F. to about 1000° F. and more usually at least about 700° F. Although it is preferred to employ in at least one embodiment, relatively low pressure operating conditions generally below about 1000 p.s.i.g., for example, 500 p.s.i.g. and lower, it is to be understood that relatively higher operating pressures are also contemplated. Accordingly the operating conditions including the pressure should not be more severe or higher than that required to accomplish the desired conversion with the selective cracking catalysts herein described. That is catalytically active alumino-silicate catalyst of the rare earth exchanged type and which are selective for the operation herein discussed are used either in pure form or with a diluent material which is substantially inert to the conversion reactions being performed or in combination with other active catalytic component having cracking and/or hydrogenating activity. Accordingly, the operating condition employed in the processing steps herein described will vary measurably depending on the catalyst employed. Conversion of hydrocarbons in any one stage is however intentional limited or controlled to an extent representing only partial conversion of the desired overall conversion so that the overall conversion will be the sum of the partial conversions in all stages. It is not necessary or expected that the conversion be controlled to be the same in each stage and experience with different feeds among other things will permit selecting the optimum conversions desired for any one stage to operate most efficiently in accordance with the method of this invention. It is believed however that the "used" catalyst particles recovered from each conversion step and returned to the regenerator from all stages should be substantially uniform with respect to the level of carbonaceous material deposited on the catalyst particles. Such a method of operation as proposed in accordance with this invention is not inconsistent since catalyst to oil ratios and hydrocarbon contact times in the separate stages of contact can be controlled substantially independently of each other and increased conversion in any one stage can be obtained at a higher catalyst/oil ratio without a significant increase in coke content on the spent catalyst. In the method and systems of this invention, the activity of the used catalyst may therefore be controlled to be only slightly less active than the regenerated catalyst and the activity can be controlled at substantially any desired value below that of fresh make up catalyst.

Removal of substantially any desired portion of the carbonaceous material or polymer from the catalyst particles removed from the regeneration section can be controlled by regulating the regenerator temperature and hydrogen partial pressure. It is preferred therefore that the catalyst be regenerated under conditions to retain a desired amount of an activity controlling residual coke on the catalyst particles. This operating flexibility and means of control is particularly desirable when characteristics of the hydrocarbon feed necessitates the use of relatively high operating temperatures at which a fresh high activity catalyst without any residual coke therein might cause overcracking. However the method and systems of this invention are particularly advantageous since the range in activity of catalyst in any one stage is small and this condition contributes to permitting more optimum selectivity of conversion for any one conversion step.

Because the activity level of the catalyst is maintained substantially the same or within relatively narrow limits in all stages of the system, adjusting of the reaction zone temperature in any one stage is highly desirable. Any feasible means of adjusting or regulating the temperature of the flowing vapor stream between the separator on one stage and the initial contacting on the following dispersed phase conversion stage can be accommodated in the systems herein described. Furthermore, reaction heat can be controlled as a balance of the catalyst exothermic hydrocracking activity with its endothermic cracking activity. The important feature in this regard is that the separation of catalyst and hydrocarbon vapors at the end of each dispersed phase contact step permits adjusting the temperature of the hydrocarbon vapors because the hydrocarbon conversion is essentially stopped during this separation period. In currently employed systems, as is well known to those familiar in the prior art, it is necessary to supply the reaction heat during the contact time between the hydrocarbon vapors and catalyst because for the most part the hydrocarbons are not separated from the catalyst between the time of initial contact and ultimate conversion. On the other hand, to overcome this shortcoming, the initial contact is usually effected in the prior art at temperatures causing some overcracking and the extended residence time thereafter to achieve an average desired conversion also contributes to this overcracking since some materials in the feed are more refractory than others. In the staged system of this invention there is provided the capability of operating at very short contact times combined with relatively long heat input or cooling times intermediate the separate dispersed phase contact steps to provide the most optimum operating conditions for conversion of the hydrocarbon feed to desired products. By the method and systems of this invention an arrangement is provided for the conversion of hydrocarbons to useful products under conditions to control and/or significantly reduce coke yields and provide for improved gasoline selectivity. Furthermore the use of hydrogen rich gases for regeneration and activity controlling the catalyst used in each conversion step not only recovers high boiling residual components changeable into coke as useable hydrocarbons but also permits considerable simplification of construction by eliminating the need for costly seals and purging equipment between the cracking and regeneration zones.

Having thus provided a general description of the improved method and system of this invention and discussed particular embodiments with respect thereto, reference is now had by way of example to the drawings which diagrammatically present specific examples of arrangements of apparatus for practicing the method of this invention.

The figure presents diagrammatically in elevation an arrangement of apparatus comprising a plurality of dispersed phase contact zone in combination with a regeneration chamber containing a dense fluid bed of catalyst particles.

Referring now to the figure by way of example an arrangement of apparatus is shown comprising a system for the conversion of hydrocarbons in the presence of finely divided catalytic material of a fluidizable particle size and regeneration of the particle material in a dense fluid bed condition. In the arrangement shown, a hydrocarbon feed enters by conduit 2 and is combined with a hydrogen containing vaporous stream in conduit 4 and finely divided catalytic material in conduit 6 controlled by valve 8 to form a relatively dispersed catalyst phase suspension. The thus formed mixture or suspension at an elevated hydrocarbon conversion temperature and pressure sufficient to cause flows of hydrocarbons through the system as desired passes upwardly through a riser 10 to a separator 12. In separator 12, hydrocarbon vapors are separated from catalyst particles so that the catalyst particles, after limited contact with hydrocarbon reactant, may be returned to the regeneration section by standpipe 16. The hydrocarbon vapors partially converted in riser 10 and separated from catalyst particles in separator 12 are adjusted to a suitable temperature by any convenient method during passage through conduit 18 to the inlet of riser 24. The vaporous hydrocarbons in conduit 18 are combined with additional catalyst regenerated with hydrogen as herein described introduced by conduit 20 containing control valve 22 to form a second hydrocarbon catalyst suspension. The second suspension at a desired elevated conversion temperature is thereafter passed through a riser 24 to a second separator 26. In separator 26 the suspension is separated primarily into a vaporous hydrocarbon stream and a catalyst particle stream. The separated catalyst is then returned to the dense fluid bed of catalyst undergoing regeneration by standpipe 28. The hydrocarbon vapors thus separated are withdrawn by conduit 30, temperature adjusted to a desired elevated temperature during passage through conduit 30 and thereafter combined with additional freshly regenerated catalyst introduced by conduit 32 containing control valve 34 to form a third suspension of hydrocarbon vapors and catalyst particles. The thus formed third suspension is thereafter passed through another dispersed phase elongated reaction zone 36 discharging into separator 38. In separator 38, the third suspension is separated into a hydrocarbon phase and a catalyst phase with the catalytic phase being returned to the regeneration zone by standpipe 40. The separated hydrocarbon phase having thus traversed several stages of cracking in the presence of hydrogen is withdrawn and passed by conduit 42 if sufficiently converted to a product fractionator not shown. On the other hand the hydrocarbon vapors may be passed through one or more additional stages of conversion if desired. In the arrangement of FIGURE I, the separated catalyst from each stage of conversion is returned by suitable standpipes 16, 28 and 40 respectively to a dense fluid bed of catalyst 44 being regenerated with hydrogen rich gas and introduced by conduit 46 beneath grid 48 in regeneration zone 50. Withdrawal conduits or standpipes 6, 20 and 32 respectively are provided for withdrawing separate regenerated catalyst streams to form the suspension hereinbefore mentioned in contact zones 10, 24 and 36.

In regeneration zone 50, the catalyst particles are maintained in a dense fluid bed condition with a hydrogen rich fluidizing gas preheated to a suitable elevated temperature. In a particular embodiment regenerator 50 is maintained at a hydrogen partial pressure of about 400 p.s.i.g. Generally it is preferred to operate the regenerator at a minimum pressure below about 1000 p.s.i.g. and preferably less than about 500 p.s.i.g. but sufficiently elevated to remove polymer and condensation products from the catalyst particles.

At least one cyclone separator 58 provided with a dip leg 60 is provided in the regenerator for separating hydrogen containing gasiform material from catalytic particles. The separated catalyst particles are returned to the bed of particles by dip leg 60. The hydrogen containing gasiform material is removed from separator 58 by conduit 62 and separated into two streams 64 and 4. That is, a portion of the hydrogen containing gasiform material may be passed by conduit 64 for combining with the feed before it passes through a suitable feed heater not shown. On the other hand the hydrogen containing gas may flow by conduit 4 to conduit 2 containing preheated hydrocarbon feed. A flow control valve 68 operated by flow control means 70 is provided in conduit 62.

It is to be understood that suitable heaters not shown may be provided in conjunction with the dense fluid bed of catalyst in the regenerator and means not shown may also be provided in conjunction with the standpipes 16, 28 and 40 for heating or cooling the catalyst to be regenerated.

Although the regeneration section of the system herein described shows a single dense fluid bed of catalyst, it is to be understood that separate systems comprising a dense fluid bed of catalyst in conjunction with a riser reaction zone, cyclone and standpipe may be employed or a combination thereof to provide adequate stages for each hydrocarbon conversion. In another arrangement the regeneration vessel 50 may be suitably separated to provide separate catalyst beds in separate compartments feeding a single riser contact zone. On the other hand the catalyst removed from the conversion stages may be subjected to an initial stage of regeneration in one compartment before being passed sequentially through one or more separate second stages of regeneration thereby permitting a more uniform desired removal of condensation product and polymer from the catalyst particles before reuse in the dispersed phase hydrocarbon conversion steps provided.

When employing an arrangement of separate systems comprising a dense fluid bed regeneration zone in combination with a dispersed phase contact zone, a separator zone and a catalyst return leg to the dense fluid bed it is possible to operate a plurality of these arrangements when suitably connected for flow of hydrocarbon therethrough under the same or different conversion conditions of temperature and pressure. Furthermore, the catalyst to oil ratios may be different but more importantly different catalysts may be employed in the separate steps at the same or different hydrogen partial pressure. That is catalyst of different activity and selectivity may be em-

We claim:

1. A method for converting hydrocarbons which comprises passing a hydrocarbon feed to be converted to lower boiling hydrocarbons through at least two sequentially connected elongated reaction zones with sufficient freshly regenerated catalyst in each zone to form a dispersed catalyst-hydrocarbon vapor suspension therein, maintaining the hydrocarbon vapor being converted in contact with suspended catalyst particles in said reaction zones under conditions to achieve only partial conversion of the hydrocarbons to lower boiling hydrocarbons in each reaction zone but sufficient to achieve substantially uniform deposition of carbonaceous material on the catalyst employed in each reaction zone, separating particles of catalyst from hydrocarbon vapors at the end of each elongated reaction zone, adjusting the temperature of the separated hydrocarbons before passage to the next reaction zone in the sequence, regenerating the separated catalyst particles in the presence of a hydrogen rich fluidizing gas while maintaining the catalyst particles in a dense fluid bed condition, maintaining a desired hydrogen partial pressure in said regeneration zone in an amount sufficient to remove carbonaceous material from the catalyst particles, and passing a portion of the hydrogen containing feed to at least the first of said sequence of reaction zones.

2. A method for converting hydrocarbons with a highly active alumino-silicate cracking catalyst which comprises passing a suspension comprising an alumino-silicate cracking catalyst dispersed in gasiform hydrocarbon material through a plurality of sequentially arranged elongated contact zones, combining hydrogen regenerated aluminosilicate catalyst with the gasiform hydrocarbon material at the inlet of each contact zone, maintaining the reaction conditions of time and temperature in each of said contact zones sufficient to achieve a partial conversion of the hydrocarbon feed material and in amounts to obtain substantially uniform deposition of carbonaceous material on the catalyst particles employed in each contact zone, separating gasiform hydrocarbon material from catalyst particles discharged from each contact zone, adjusting the temperature of the hydrocarbon separated from the catalyst sufficient for passage to the next contact zone in the sequence of zones, removing carbonaceous deposits from the separated catalyst at an elevated pressure up to about 1000 p.s.i.g. by contact with hydrogen rich gases maintained at a desired elevated hydrogen partial pressure, passing fresh hydrogen regenerated catalyst particles to the inlet of each contact zone and passing hydrogen containing off gases recovered from said catalyst regeneration step to the first of said plurality of contact zones.

3. A method for converting hydrocarbons in the presence of rare earth exchanged crystalline aluminosilicates having a selective activity for cracking hydrocarbons in the presence of hydrogen which comprises, removing with hydrogen rich gases polymer and condensation products deposited on an alumino-silicate cracking catalyst during conversion of hydrocarbons, said hydrogen contacting of said cracking catalyst being sufficiently severe to remove substantially all but a desired amount of residual carbonaceous material on the catalyst particles, passing catalyst particles thus treated separately to the inlet of each of a plurality of hydrocarbon conversion zones, combining the catalyst particles passed to the inlet of each conversion zone with sufficient vaporous hydrocarbons to form a suspension of catalyst particles in hydrocarbon vapors, passing the formed suspensions through the plurality of conversion zones under conditions to limit the extent of conversion obtained in each conversion zone so that the deposition of polymer and condensation product on the catalyst in each conversion zone is substantially the same, separating hydrocarbon vapors from catalyst particles at the outlet of each conversion zone, passing the separated catalyst to said hydrogen contacting step and passing only insufficiently converted hydrocarbons from one conversion zone to another in the plurality of conversion zones.

4. A fluidized catalytic process for effecting the conversion of hydrocarbons in the presence of hydrogen which comprises, combining finely divided hydrogen regenerated particles with a plurality of separate hydrocarbon fractions in separate catalytic reaction zones under conditions to form a relatively dilute hydrocarbon-catalyst suspension for passage therethrough, converting hydrocarbons in the separate suspensions thus formed under preferential conditions of temperature, catalyst to hydrocarbon ratio and space velocity to obtain a limited conversion of hydrocarbons in each reaction zone so that a relatively uniform deposition of condensation product of conversion is formed on the catalyst, separating a suspension discharge from each reaction zone into a catalyst stream and a stream of insufficiently converted hydrocarbons, adjusting the temperature of the insufficiently converted hydrocarbons and thereafter passing the temperature adjusted hydrocarbons to another of the plurality of reaction zones as one of the plurality of separate hydrocarbon fractions above referred to, removing condensation product from said catalyst by regenerating with hydrogen rich gases at an elevated pressure in a catalyst regeneration zone, maintaining the hydrogen pressure in the regeneration zone by controlling the volume of regeneration off gas withdrawn as a function of the regenerator off gas density and passing a portion of the regeneration off gas thus recovered with hydrocarbon feed to at least one of said catalytic reaction zones.

5. The method of claim 3 wherein only insufficiently converted hydrocarbons are passed from one riser contact zone to another.

6. The method of claim 2 wherein the hydrogen partial pressure of the regeneration step is controlled by the amount of hydrogen rich gas added to the regeneration zone and the volume of regeneration off gas removed therefrom as a function of the off gas density.

7. The method of claim 2 in which all of the hydrocarbon vapors recovered from the catalyst discharged from each reaction zone are passed sequentially to another of the plurality of hydrocarbon conversion contact zones at a desired conversion temperature.

8. The method of claim 2 wherein only insufficiently converted hydrocarbons are passed sequentially through the plurality of contact zones.

9. The method of claim 2 wherein the catalyst separated from each hydrocarbon contact zone is passed to a common fluid bed of catalyst being hydrogen regenerated.

10. The method of claim 2 wherein the catalyst separated from the separate reaction zone is passed to a separate dense fluid catalyst bed and hydrogen containing vapors recovered as off gas from each dense fluid bed is passed at least in part to the reaction zone from which the catalyst is obtained.

11. The method of claim 2 wherein the regeneration zone is maintained at a pressure substantially above the pressure employed in said reaction zones and the catalyst particles passed to any one reaction zone from said regeneration zone contains an amount of residual carbonaceous deposit sufficient to limit the activity of the catalyst to a desired value.

12. The method of claim 10 wherein catalyst of different activity are employed in the separate reaction zones and at least one of the catalysts employed has a hydrogenating influence on the hydrocarbon conversion reaction product.

13. The method of claim 2 wherein the dispersed phase hydrocarbon conversion steps are carried out under conditions such that the exothermic heat released by hydrocracking is in balance with the endothermic heat requirement of said dispersed phase hydrocarbon conversion steps.

References Cited

UNITED STATES PATENTS

| | | | |
|---|---|---|---|
| 2,284,603 | 5/1942 | Belchetz et al. | 208—153 |
| 2,378,342 | 6/1945 | Voorhees et al. | 208—164 |
| 2,425,555 | 8/1947 | Nelson | 208—156 |
| 2,895,906 | 7/1959 | Harper | 208—164 |
| 3,198,729 | 8/1965 | Payne | 208—168 |
| 3,210,265 | 10/1965 | Garwood | 208—111 |

DELBERT E. GANTZ, *Primary Examiner.*

ABRAHAM RIMENS, *Examiner.*

UNITED STATES PATENT OFFICE

CERTIFICATE OF CORRECTION

Patent No. 3,393,145                                                July 16, 1968

Thomas Dill et al.

It is certified that error appears in the above identified patent and that said Letters Patent are hereby corrected as shown below:

Column 7, line 29, after "containing" insert -- gases removed from said regeneration zone with hydrocarbon --.

Signed and sealed this 23rd day of December 1969.

(SEAL)
Attest:

Edward M. Fletcher, Jr.
Attesting Officer

WILLIAM E. SCHUYLER, JR.
Commissioner of Patents